(12) United States Patent
Rowell et al.

(10) Patent No.: US 10,470,009 B2
(45) Date of Patent: Nov. 5, 2019

(54) TEST DEVICE AND TEST METHOD

(71) Applicant: Rohde & Schwarz GmbH & Co. KG, München (DE)

(72) Inventors: Corbett Rowell, München (DE); Hendrik Bartko, Unterhaching (DE); Adam Tankielun, Ottobrunn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 84 days.

(21) Appl. No.: 15/410,384

(22) Filed: Jan. 19, 2017

(65) Prior Publication Data

US 2018/0205821 A1 Jul. 19, 2018

(51) Int. Cl.
*H04W 4/20* (2018.01)
*H04W 4/021* (2018.01)

(52) U.S. Cl.
CPC ............. *H04W 4/20* (2013.01); *H04W 4/022* (2013.01)

(58) Field of Classification Search
CPC ......... H04M 3/28; H04W 4/022; H04W 4/20; H04B 17/15; G01R 29/0821; G01R 29/105; H01Q 3/267
See application file for complete search history.

(56) References Cited

U.S. PATENT DOCUMENTS

| 2006/0055592 A1* | 3/2006 | Leather ................ G01R 29/105 342/174 |
| 2015/0035707 A1 | 2/2015 | Tankielun |
| 2015/0260772 A1* | 9/2015 | Aubin .................. G01R 29/105 343/703 |

FOREIGN PATENT DOCUMENTS

| CN | 103298020 A | 9/2013 |
| EP | 2627015 A2 | 8/2013 |
| WO | WO2012171562 | * 12/2012 |

OTHER PUBLICATIONS

Extended European Search Report for European Application No. 16176808.0 (dated Dec. 13, 2016).
Commonly-assigned, co-pending U.S. Appl. No. 15/468,238 for "Over the Air Power Sensor and Method," (Unpublished, filed Mar. 24, 2017).
European Patent Application No. 16176808.0, "Over the Air Power Sensor and Method," (Unpublished, filed Jun. 29, 2016).

\* cited by examiner

*Primary Examiner* — Jianxun Yang
(74) *Attorney, Agent, or Firm* — Shumaker & Sieffert, P.A.

(57) ABSTRACT

A test device for a wireless communication device comprises a device support that accommodates the wireless communication device, a movable position determination device, a number of wireless probes for communicating with the wireless communication device, and a mechanical probe support, wherein the wireless probes are mechanically coupled to the probe support and the probe support is mechanically coupled to the position determination device.

29 Claims, 5 Drawing Sheets

TEST DEVICE AND TEST METHOD

TECHNICAL FIELD

The present invention relates to a test device for a wireless communication device. The present invention further relates to a respective test method.

BACKGROUND

Although applicable in principle to any system that measures RF signals, the present invention and its underlying problem will be hereinafter described in combination with probe chambers or probe stations for wireless communication devices.

Modern communication devices may be used in a plurality of applications. Such communication devices may e.g. be used in conversation systems, like e.g. mobile telephone systems. Further such modern communication devices may also be used e.g. in IoT applications (Internet-of-Things), in sensors and/or actuators, or the like.

Such devices will primarily communicate via a wireless interface and may e.g. use LTE, 5G, WLAN/WIFI, ZigBee, Bluetooth communication interfaces or any other type of wireless communication interface that adequately suits the respective application. The wavelengths of the respective communication signals may e.g. be in the centimeter or millimeter range.

During development or production or later conformance testing of such communication devices, specific tests have to be performed with the communication devices. Such tests are needed to make sure that the communication device complies with the respective legal and/or standards related regulations.

For performing the respective tests, complex mechanical test structures or devices are usually used, that e.g. comprise a robot arm that moves a probe around a device under test to receive the signals from the device from different positions.

Against this background, the problem addressed by the present invention is to allow simplified testing of mobile devices.

SUMMARY

The present invention solves this object by a test device with the features of claim 1 and a test method with the features of claim 21.

Accordingly it is provided:

A test device for a wireless communication device, the test device comprising a device support, like e.g. a table or mechanical fixture, especially a vibration free table or mechanical fixture that accommodates the wireless communication device, and e.g. mechanically fixes the wireless communication device in a predetermined position, a movable position determination device. The test device further comprises a number i.e. one or more of wireless probes for communicating with the wireless communication device, and a mechanical probe support, wherein the wireless probes are mechanically coupled to the probe support and the probe support is mechanically coupled to the position determination device.

Further, it is provided:

A test method for a wireless communication device, the test method comprising determining a position of the wireless communication device on a device support with a movable position determination device, wherein a mechanical probe support is mechanically coupled to the position determination device, and wherein a number of wireless probes are mechanically coupled to the probe support. The test method may further comprise positioning the wireless probes for a measurement by moving the movable position determination device, and performing a device test using the probes.

The present invention is based on the finding that complex test arrangements with mechanical structures that allow complex movements of a probe are error prone, difficult to calibrate and expensive.

The present invention therefore provides a test device with reduced complexity, where the wireless probes are attached to the mechanical probe support that is in addition attached to the movable position determination device.

This means that by moving the position determination device the mechanical probe support and therefore the probes may be moved in the test device.

The position determination device is provided in the test device to exactly position the wireless communication device on the device support.

Therefore, by using the position determination device as support for the mechanical probe support and therefore the wireless probes, a separate complex mechanical movement apparatus for a probe is not needed with the present invention.

The wireless communication device may be any kind of active or passive communication device. Such devices may e.g. comprise systems on chip, so called system and package units, so called antenna and package units, integrated circuits with antennas "on chip", or integrated circuits with "off chip" antennas, single antennas, like e.g. millimeter wave antennas, or antenna elements of an antenna array or an array antenna or the like. The size of the active elements, being "active" regarding the measurement, may e.g. be between 0.2 mm-2.5 mm side length in every axis.

Further embodiments of the present invention are subject of the further subclaims and of the following description, referring to the drawings.

In a possible embodiment, the test device may further comprise a housing, wherein, at least during a measurement, the device support and the wireless probes and the mechanical probe support may be positioned inside of the housing, and wherein the position determination device may be movably mounted in the housing. If the position determination device is movably mounted in the housing, it can e.g. be rotated during a measurement of a wireless communication device. Because of the coupling of the mechanical probe support and the wireless probes to the position determination device, any movement of the position determination device will translate to movements of the wireless probes. It is therefore possible to perform measurements with the wireless probes at different positions with respect to the wireless communication device without providing a dedicated movement apparatus for the probes.

In a possible embodiment, the housing may comprise an anechoic chamber. An anechoic chamber eliminates or at least reduces interferences in RF signals caused by reflections of the RF signals in the chamber. Therefore, the use of an anechoic chamber will improve the measurement accuracy of the test device.

In a possible embodiment, the position determination device may be retractably mounted in the housing, such that it can e.g. be retracted after positioning the wireless communication device and before initiating a measurement.

The position determination device usually will comprise a housing. Such a housing may cause signal reflections and therefore negatively influence the measurement. The use of a retractably mounted position determination device therefore allows eliminating or at least reducing interferences that may be caused during the measurement by the presence of the position determination device.

In a possible embodiment, the position determination device may be mounted in the housing movable relatively to the device support. This allows e.g. modifying the distance between the position determination device and the wireless communication device. When moving the position determination device at the same time the distance between the wireless communication device and the wireless probes will be adapted.

Measuring the signals emitted by the wireless communication device in different distances e.g. allows performing a path loss measurement.

In a possible embodiment, the mechanical probe support may be movable relatively to the position determination device. For example a mechanical release device, clamps, a detent or the like may be provided that allows reversibly separating or releasing the mechanical probe support from the position determination device. This allows e.g. positioning the wireless probes while supervising the position of the wireless communication device. After successfully positioning the wireless probes by moving the position determination device, the mechanical coupling may be released and the position determination device may e.g. be retracted out of the housing.

In a possible embodiment, the test device may comprise an electromechanical or manual movement control device for the position determination device and/or the mechanical probe support. The electromechanical movement control device may e.g. comprise one or more electric motors together with respective power drivers and a motor control unit. The control signal may e.g. be generated by a control device of the test device or by inputs of a user. A manual movement control device may e.g. comprise a hand wheel for turning or levers for moving the mechanical probe support and/or the position determination device. The coupling or decoupling of the mechanical probe support with the position determination device may also be controlled by the electromechanical or manual movement control device.

In a possible embodiment, the position determination device may comprise a visual position determination device, like e.g. a camera, a microscope or the like and/or a distance measurement-based position determination device, like e.g. a laser or ultrasonic or RF distance sensor. Visual position determination devices facilitate a simple positioning of the wireless communication device e.g. by a user of the test device, since the user will see the actual position of the test device and may correct the position with immediate visual feedback. Distance measurement-based position determination devices may provide simpler automatic evaluation of the position of the wireless communication device. However, a user may also use a distance indication for positioning the wireless communication device and an automatic positioning device may also evaluate the visual information, e.g. with an image recognition algorithm or the like.

In a possible embodiment, the test device may comprise a display device coupled to the position determination device, wherein the display device receives position information for the wireless communication device from the position determination device and displays the position information. In contrast to e.g. a traditional microscope, a display is easily accessible and may be viewed from multiple directions. The display may display an image of the wireless communication device on the device support and/or the wireless probes. In addition the display may display coordinates of the wireless communication device on the device support and/or the wireless probes. The display therefore improves the positing process for the wireless communication device.

In a possible embodiment, the position determination device may determine the absolute position of the wireless communication device or may determine the relative position of the wireless communication device at least with regard to one of the wireless probes. The position determination device therefore allows preparing and performing a very precise measurement with the wireless communication device.

In a possible embodiment, the wireless probes may comprise an antenna with one or two polarizations and/or an over the air power sensor with one or two polarizations and/or power measurement diodes for one or two polarizations. As wireless probe any antenna may be used that is adapted to the frequencies of the respective signals that are emitted by the wireless communication device or that are transmitted to the wireless communication device.

The use of over the air power sensors simplifies the measurements or the analysis of the measurement results. Such an over the air power sensor is e.g. described in European patent application No. 16 176 808.0, which is incorporated herein by reference.

In a possible embodiment, the wireless probes may receive signals emitted by the wireless communication device. If the wireless probes receive signals emitted by the wireless communication device, transmission measurements of the wireless communication device may be performed.

In a possible embodiment, the wireless probes may wirelessly transmit signals to the wireless communication device. Sending signals to the wireless communication device with the wireless probes allows performing a reception measurement with the wireless communication device.

In a possible embodiment, the test device may comprise a signal evaluation unit with an input interface that is coupled to the wireless probes and with a signal analyzing device that is coupled to the input interface and analyzes signals received by the wireless probes. The signal evaluation unit may e.g. be integrated in a control unit of the test device. Such a control unit may e.g. comprise all control devices, and displays or user inputs or the like that may be provided to interact with the test device.

The signal analyzing device may comprise analog circuitry, like e.g. filters, attenuators, amplifiers or the like, and/or digital circuitry, like e.g. analog to digital converters, signal processors, general purpose processors, a data memory or the like, that may be necessary to record and/or evaluate the received signals. For example a processor may be provided with an analog to digital converter for every wireless probe. The wireless probes may be directly coupled to the respective analog to digital converter or analog filters, attenuators or the like may be provided in the respective signal path.

In a possible embodiment, the test device may comprise a probe signal generator with a signal output that is coupled to the wireless probes and with a signal generation device that is coupled to the signal output and generates output signals that are transmitted to the wireless probes for emission by the wireless probes. The probe signal generator may e.g. also be integrated in the above mentioned control unit of the test device.

The signal generation device may comprise analog circuitry, like e.g. filters, attenuators, amplifiers or the like, and/or digital circuitry, like e.g. digital to analog converters, signal processors, general purpose processors, a data memory or the like, that may be necessary to provide the output signals. For example a processor may be provided with a digital to analog converter for every wireless probe that provides the respective signals to the probe. The wireless probes may be directly coupled to the respective digital to analog converter, or analog filters, attenuators or the like may be provided in the respective signal path.

In a possible embodiment, the test device may comprise a device signal generator with a signal output that during a measurement is coupled to the wireless communication device, e.g. via signal probes and wired signal or communication lines, and with a signal generation device that is coupled to the signal output and generates output signals that are transmitted to the wireless communication device for emission by the wireless communication device. The device signal generator allows providing passive wireless communication devices like, e.g. antennas, with a signal that may then be emitted by the respective wireless communication device.

The device signal generator may e.g. also be integrated in the above mentioned control unit of the test device.

The signal generation device may comprise analog circuitry, like e.g. filters, attenuators, amplifiers or the like, and/or digital circuitry, like e.g. digital to analog converters, signal processors, general purpose processors, a data memory or the like, that may be necessary to provide the output signals. For example a processor may be provided with a digital to analog converter that provides the respective signals to the wireless communication device e.g. via wired probes that contact the wireless communication device on the device support. The wired probes may be directly coupled to the respective digital to analog converter, or analog filters, attenuators or the like may be provided in the respective signal path.

In a possible embodiment, the mechanical probe support may comprise at least one circular arc shaped support that is coupled in the center of the arc with the position determination device and carries the wireless probes. The arc shaped support may carry a plurality of wireless probes symmetrically or evenly distributed over the arc. This arrangement allows providing a plurality of wireless probes, which may all be moved at the same time by moving the mechanical probe support and may all comprise the same distance to a center point of the arc.

The probes may be detachably coupled with the circular arc shaped support. Further, the circular arc shaped support may comprise signal lines, especially shielded signal lines that contact the single wireless probes. The signal lines may e.g. exit the housing of the test device where the position determination device may be retracted.

In a possible embodiment, the arc may carry the wireless probes such that the directions of main sensitivity of the probes intersect at the center point or focus point of the arc. Focusing the wireless probes to one point allows focusing the probes to the source of wireless signals emitted by the wireless communication device, e.g. an antenna or a single antenna element of an antenna of the wireless communication device.

If the wireless communication device is off the center point at which the directions of main sensitivity of the wireless probes intersect, a measurement control unit of the test device may e.g. perform a correction by adding a respective phase offset to the respective measured signals.

In a possible embodiment, the mechanical probe support may comprise two circular arc shaped supports that are each coupled in the center of the respective arc with the position determination device and that comprise a predetermined angle, especially a 90° angle, to each other. With two circular arc shaped supports that carry the wireless probes, the number of probes may be increased. This allows measuring signals at an increased number of points in space at the same time and therefore reducing the duration of a measurement.

In a possible embodiment, the test device may comprise a measurement control unit that is coupled to the wireless probes and evaluates signals received by the wireless probes and/or that is coupled to the wireless communication device and evaluates signals received by the wireless communication device. It is understood that the measurement control unit may also generate or command the signal generator to generate signals that are provided to the wireless communication device or the wireless probes for emission.

The evaluation performed by the measurement control unit may e.g. be a far field measurement or a near field measurement. After performing e.g. a near field measurement the measurement control unit may perform a near field to far field transformation or vice versa.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

Figure 1:
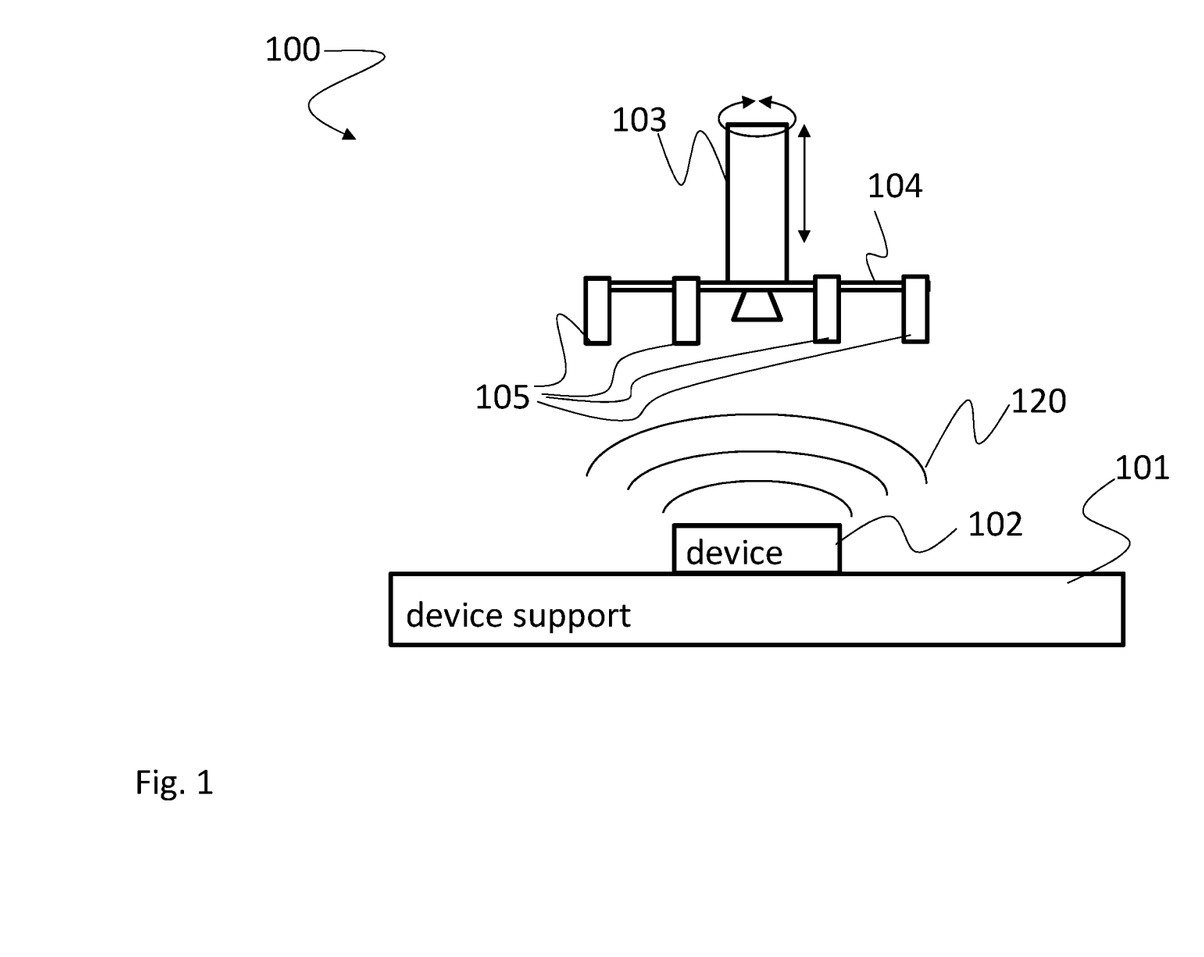
FIG. 1 shows a block diagram of an embodiment of a test device according to an embodiment of the present invention.

FIG. 1 shows an embodiment of a test device 100 according to an embodiment of the present invention. The test device 100 comprises a device support 101 that carries the wireless communication device 102. Further, the test device 100 comprises a movable position determination device 103 and a mechanical probe support 104 that is mechanically coupled to the position determination device 103 and carries wireless probes 105.

The device support 101 may e.g. comprise a table that accommodates the wireless communication device 102. Such a table may e.g. be provided as a vibration free table with respective mechanical decoupling arrangements.

The wireless communication device 102 that is positioned on the device support 101 for a measurement may be any type of RF (Radio Frequency) sensitive or active device. Such a wireless communication device 102 may comprise passive elements, like e.g. an antenna or an antenna array or single antenna elements of an antenna array, as well as analog and/or digital active elements, like e.g. signal generation elements and drivers, filters, attenuators, amplifiers or the like.

The position determination device 103 is shown comprising a camera. However, it is understood that the position determination device 103 may in addition or as alternative comprise distance measurements units and/or RF or ultrasonic position determination devices.

It is indicated in FIG. 1 that by respective arrows the position determination device 103 is movable vertically and rotatably. However, it is understood, that a lateral movement may also be possible. The movement feature of the position determination device 103 may be provided by respective mechanical arrangements (not shown for sake of clarity). Such arrangements may comprise linear and/or circular guides, clamps, fixtures or the like.

Attached to the lower end of the position determination device 103 is the mechanical probe support 104 that in FIG. 1 just exemplarily carries four wireless probes 105. It is understood that any number of probes may be provided. The mechanical probe support 104 may e.g. be a simple rigid carrier that is attached to the position determination device 103. The wireless probes 105 may be attached permanently or detachably to the mechanical probe support 104. The wireless probes 105 may e.g. comprise antennas, power sensors and/or power measurement diodes.

The depicted arrangement allows moving the wireless probes 105 at least rotatably and vertically by moving the position determination device 103. Therefore, without any additional or dedicated movement device, the wireless probes 105 may be positioned with the movement of the position determination device 103.

A measurement may be performed e.g. by receiving and measuring signals 120 emitted by the wireless communication device 102 or by sending signals to the wireless communication device 102. Further evaluation means may be provided, as will exemplarily be shown in FIG. 3.

Figure 2:
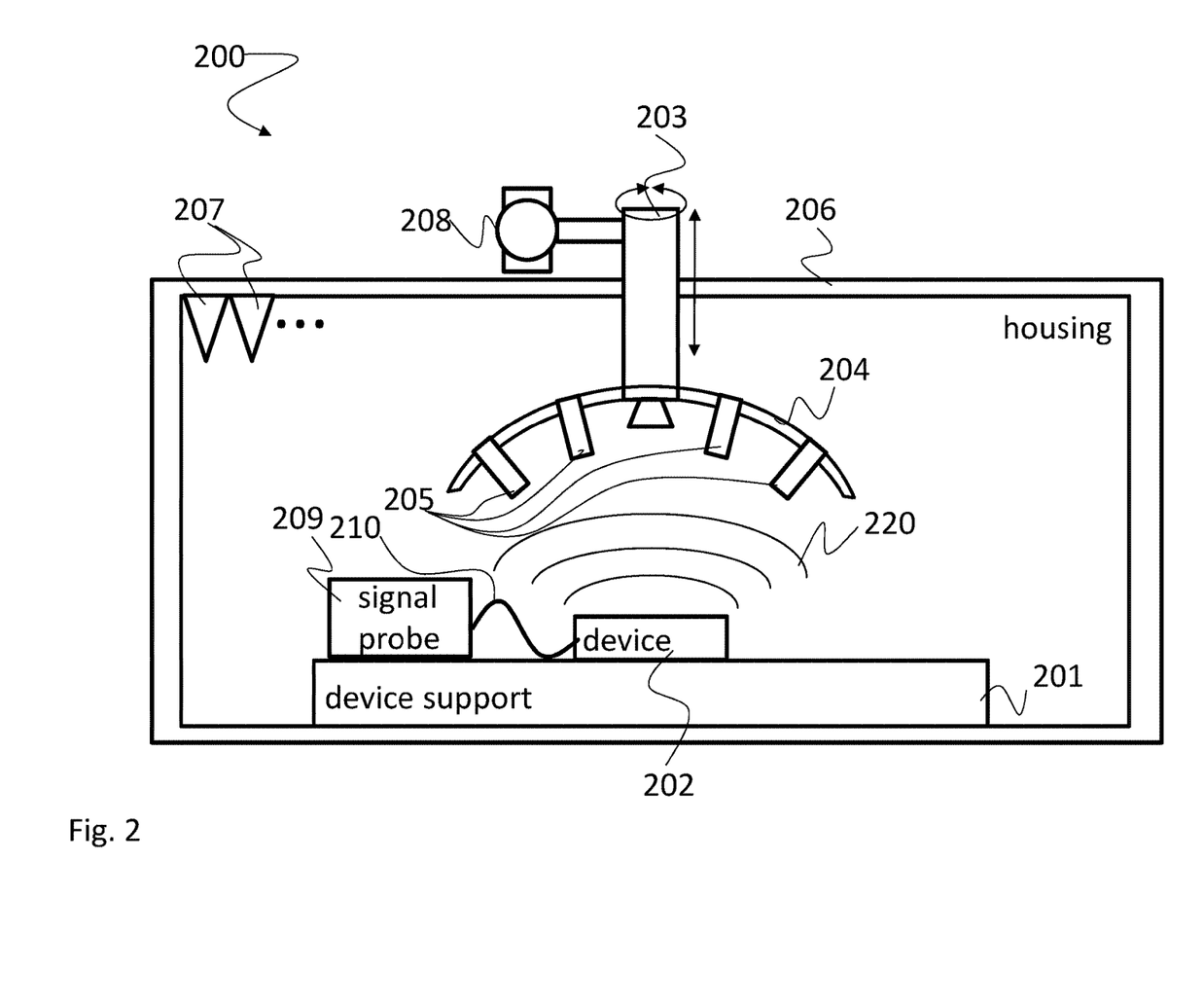
FIG. 2 shows a block diagram of another embodiment of a test device according to an embodiment of the present invention.

FIG. 2 shows another embodiment of a test device 200. The test device 200 is based on the test device 100. However, in the test device 200 the mechanical probe support 204 is not provided as a straight carrier structure but as an arc shaped carrier structure. This allows focusing the wireless probes 205 onto a common focus point and therefore optimizes the signal reception/transmission from/to the wireless communication device 202.

In FIG. 2 the test device 200 further comprises a housing 206. In the housing 206 spikes 207 are shown schematically to indicate that the housing 206 may be an anechoic chamber. Further, a movement control device 208 is provided as an electric motor for moving the position determination device 203. The electric motor 208 is schematically shown as connected to the position determination device 203. It is understood that any type and number of electric and/or electronic devices may be provided in the movement control device 208 that are necessary to provide the required movements with position determination device 203.

Finally, in FIG. 2 a signal probe 209 is provided that is connected via a signal line 210 to the wireless communication device 202. The signal probe 209 is provided exemplarily for any number of signal probes 209. The signal probes 209 may e.g. form a Signal-Ground-Signal connection or a Ground-Signal-Ground connection with the wireless communication device 202.

Figure 3:
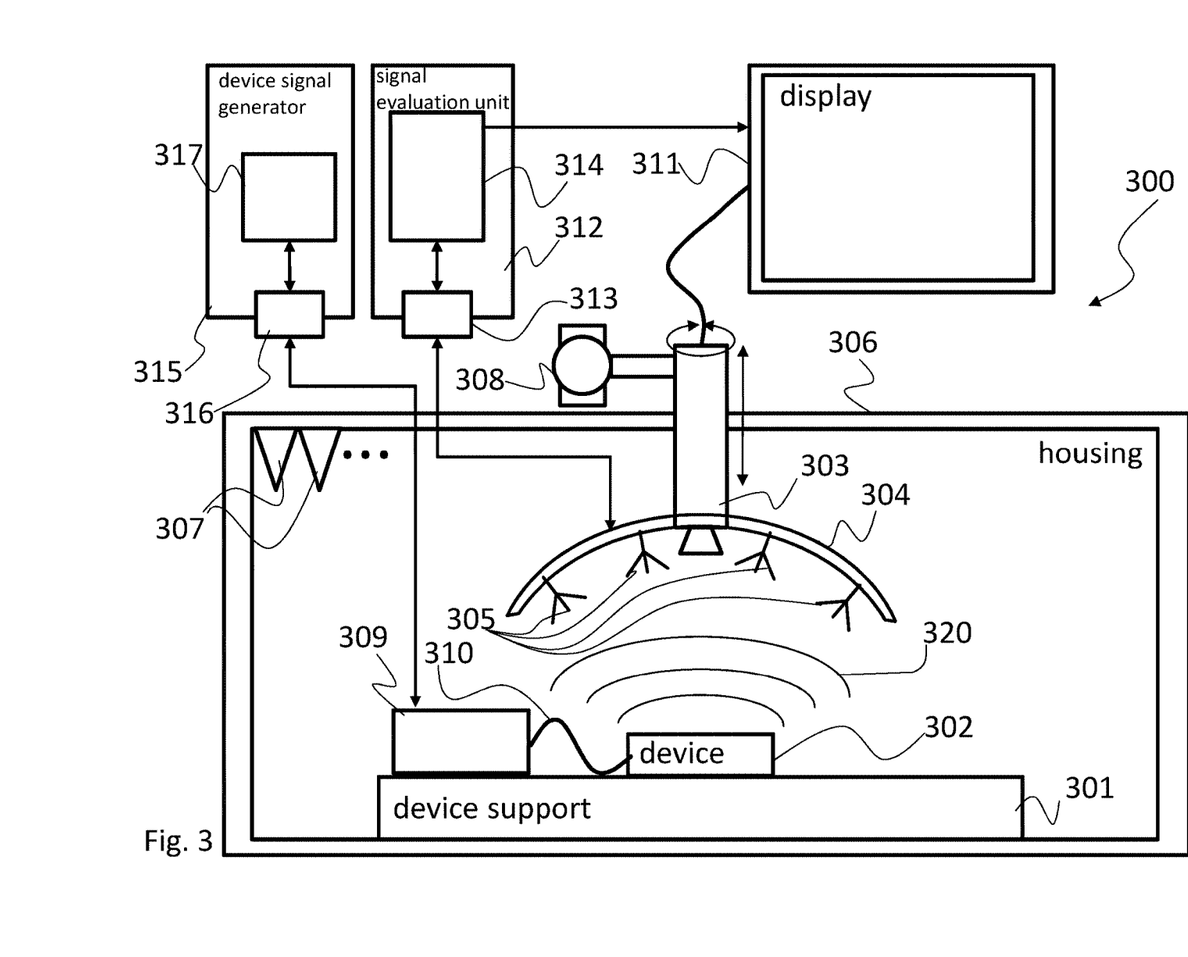
FIG. 3 shows a block diagram of another embodiment of a test device according to an embodiment of the present invention.

FIG. 3 shows a further embodiment of a test device 300 according to an embodiment of the present invention. The test device 300 is based on the test device 200 of FIG. 2. In addition to the elements shown in FIG. 2, the test device 300 comprises a display device 311 that may be used for user interaction. The display device 311 may also provide user inputs, e.g. via dedicated inputs or a touch screen interface, that may allow user interaction with the test device 300. Although not shown, the display device 311, especially the user inputs, may be coupled to any other element of the test device 300 to transmit the user inputs or receive information for displaying to the user. The display device 311 may e.g. show an image of the wireless communication device 302 recorded by the position determination device 303 or coordinates of the position determination device 303.

Further, a signal evaluation unit 312 is provided. The signal evaluation unit 312 comprises an input interface 313 coupled to a signal analyzing device 314. The input interface 313 is coupled to the wireless probes 305 to receive signals received by the wireless probes 305. The signal evaluation unit 312 may also be used to provide signals to the wireless probes 305. Any needed components may be provided in the signal evaluation unit 312. As an alternative a separate probe signal generator may be provided. With a signal output that is coupled to the wireless probes and with a signal generation device that is coupled to the signal output and generates output signals that are transmitted to the wireless probes for emission by the wireless probes.

Further, a device signal generator 315 is provided. The device signal generator 315 comprises a signal generation device 317 that is coupled with a signal output 316 that in turn is coupled to the signal probe 309. A signal generated by the signal generation device 317 may therefore be transmitted to and emitted by the wireless communication device 302. The device signal generator 315 may also be used to receive and evaluate signals that are received by the wireless communication device 302. Respective elements may be provided in the device signal generator 315 or as a separate entity.

Figure 4:
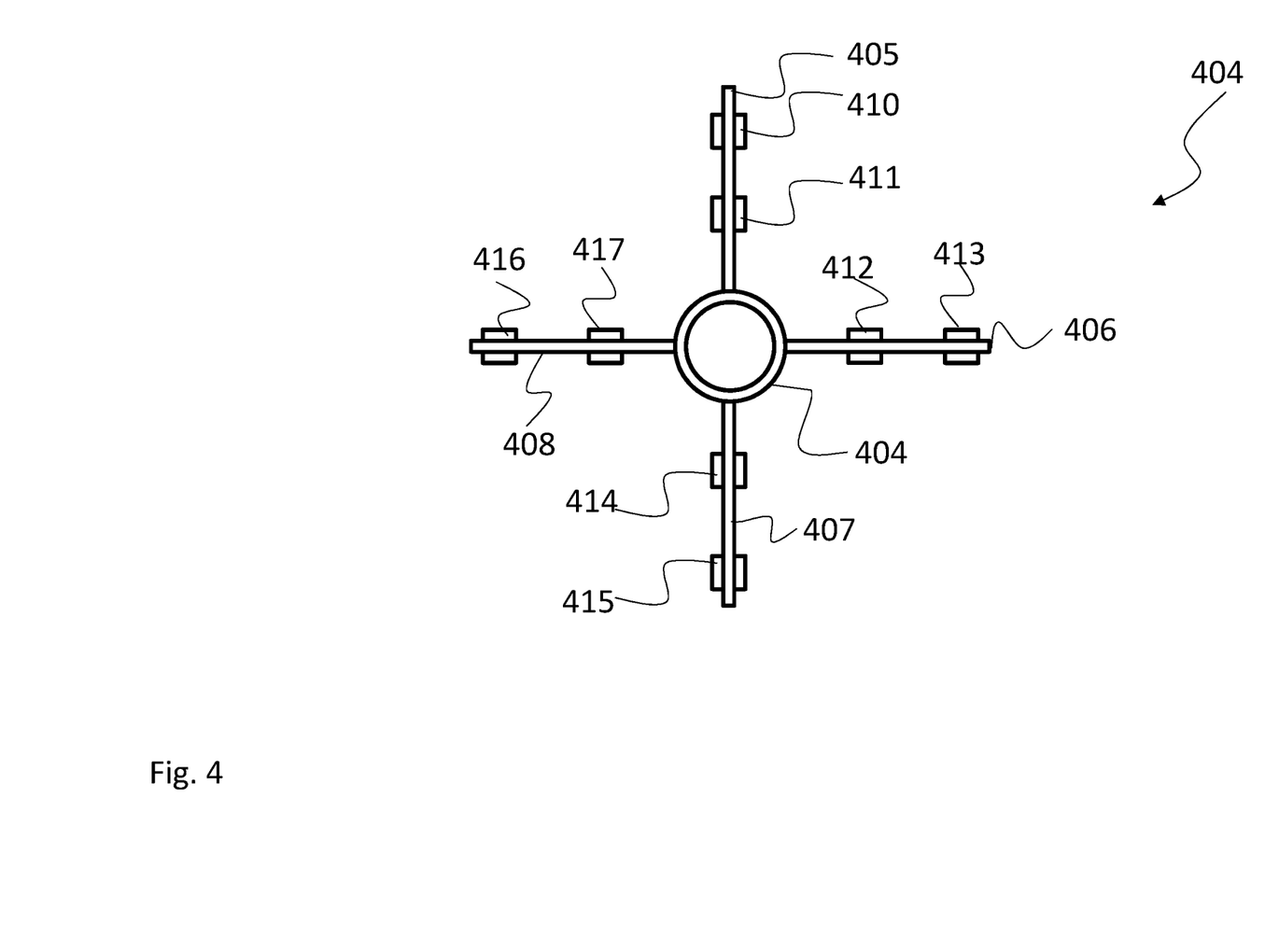
FIG. 4 shows a block diagram of another embodiment of a test device according to an embodiment of the present invention.

FIG. 4 shows a block diagram of a mechanical probe support 404 in a top-down view. The mechanical probe support 404 comprises two support rods connected in the center, which are depicted in FIG. 4 by the respective arms 405, 406, 407, 408.

The arms 405, 406, 407, 408 are arranged in 90° angles to form a cross-like arrangement. It is understood, that any other angle may also be used. Each arm 405, 406, 407, 408 as an example carries two wireless probes 409-416.

With the presented arrangement the number of points in space that can be monitored at the same time is doubled. Therefore, testing and analyzing speed may be increased approximately by factor of two.

Figure 5:
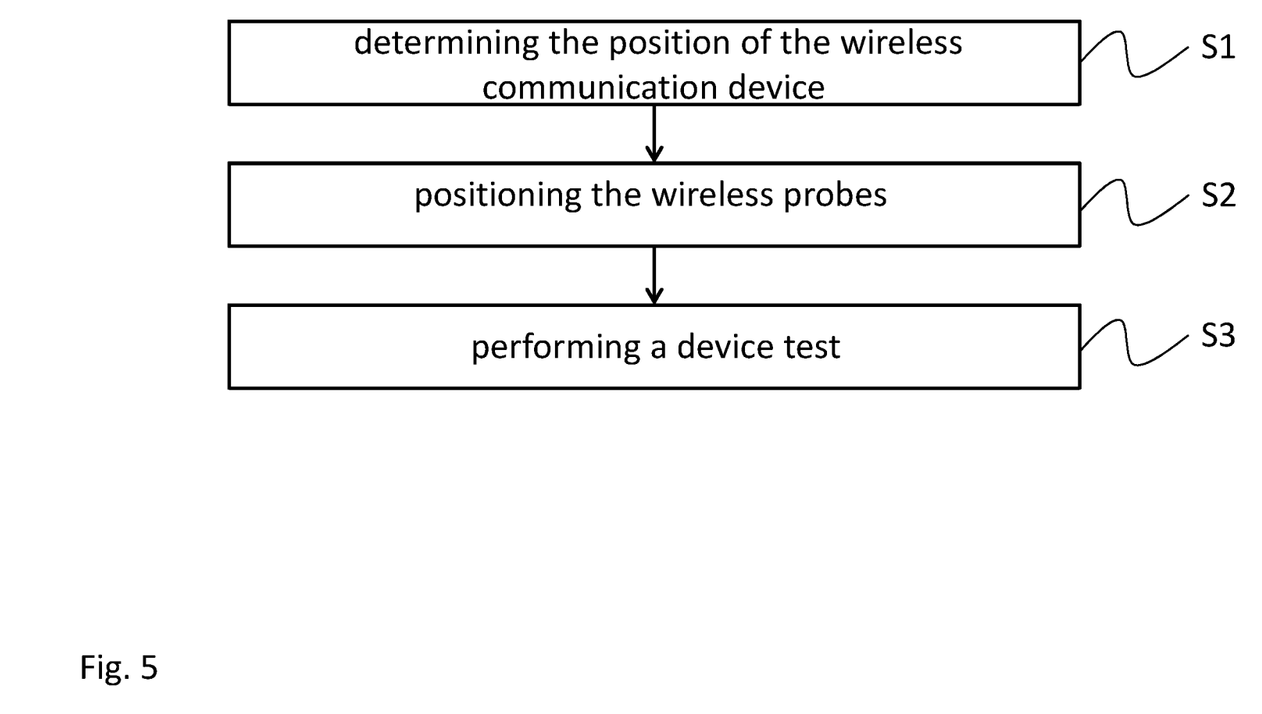
FIG. 5 shows a flow diagram of an embodiment of a test method according to an embodiment of the present invention.

FIG. 5 shows a flow diagram of an embodiment of a test method for a wireless communication device 102, 202, 302. For ease of understanding, the reference signs used in FIGS. 1-4 will also be used in method-based FIG. 5.

The test method comprises determining S1 a position of the wireless communication device 102, 202, 302 on a device support 101, 201, 301 with a movable position determination device 103, 203, 303. Determining the position of the wireless communication device 102, 202, 302 may comprise determining an absolute position in relation to a specific origin or the relative position with respect to a specific detail of the test device.

A mechanical probe support 104, 204, 304, 404 is mechanically coupled to the position determination device 103, 203, 303, wherein a number of wireless probes 105, 205, 305, 409-416 are mechanically coupled to the probe support. Further, the wireless probes 105, 205, 305, 409-416 are positioned S2 for a measurement by moving the movable position determination device 103, 203, 303, and a device test is performed S3 using the wireless probes 105, 205, 305, 409-416.

The position determination device 103, 203, 303 may e.g. be provided as a visual position determination device 103, 203, 303 and/or a distance measurement-based position determination device 103, 203, 303. Further, the position determination device 103, 203, 303 may determine the absolute position of the wireless communication device 102, 202, 302 or may determine the relative position of the wireless communication device 102, 202, 302 at least with regard to one of the wireless probes 105, 205, 305, 409-416. The wireless probes 105, 205, 305, 409-416 may comprise an antenna with one or two polarizations and/or an over the air power sensor with one or two polarizations and/or power measurement diodes for one or two polarizations. Further, the wireless probes 105, 205, 305, 409-416 may receive signals emitted by the wireless communication device 102, 202, 302. The wireless probes 105, 205, 305, 409-416 may also wirelessly transmit signals to the wireless communication device 102, 202, 302.

The mechanical probe support 104, 204, 304, 404 may be provided with at least one circular arc shaped support that carries the wireless probes 105, 205, 305, 409-416, and may be coupled in the center of the arc with the position determination device 103, 203, 303. The wireless probes 105, 205, 305, 409-416 may be provided on the arc such that the directions of main sensitivity of the probes intersect at the center point of the arc or any other predetermined point. Further, the mechanical probe support 104, 204, 304, 404 may be provided with two circular arc shaped supports that are each coupled in the center of the respective arc with the position determination device 103, 203, 303 and that comprise a predetermined angle, especially a 90° angle, to each other.

For better protection of the measurement against outside influences, the method may further comprise integrating the device support 101, 201, 301 and the wireless probes 105, 205, 305, 409-416 and the mechanical probe support 104, 204, 304, 404 inside of a housing 206, 306, especially an anechoic chamber, and movably mounting the position determination device 103, 203, 303 in the housing 206, 306.

In order to provide a flexible movement of the position determination device 103, 203, 303 and the wireless probes 105, 205, 305, 409-416, the position determination device 103, 203, 303 may be retractably mounted in the housing 206, 306. Further or as alternative, the position determination device 103, 203, 303 may be mounted in the housing 206, 306 movable relatively to the device support 101, 201, 301. In addition or as alternative, the mechanical probe support 104, 204, 304, 404 may be movable relative to the position determination device 103, 203, 303.

The positioning of the position determination device 103, 203, 303 and/or the mechanical probe support 104, 204, 304, 404 may be performed with an electromechanical or manual movement control device 208, 308, like e.g. an electric motor or levers or the like.

For an improved user interaction, the method may comprise receiving position information for the wireless communication device 102, 202, 302 from the position determination device 103, 203, 303 in a display device 311 and displaying the position information.

The generation and evaluation of the test signals may comprise analyzing signals received by the wireless probes 105, 205, 305, 409-416 with a signal analyzing device 314, generating output signals and transmitting the generated output signals to the wireless probes 105, 205, 305, 409-416 for emission by the wireless probes 105, 205, 305, 409-416, and/or generating output signals and transmitting the generated output signals to the wireless communication device 102, 202, 302 for emission by the wireless communication device 102, 202, 302, and evaluating signals received by the wireless probes 105, 205, 305, 409-416 and/or signals received by the wireless communication device 102, 202, 302 with a central measurement control unit.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300, 400 test device
101, 201, 301 device support
102, 202, 302 wireless communication device
103, 203, 303 movable position determination device
104, 204, 304 mechanical probe support
105, 205, 305 wireless probe
206, 306 housing
207, 307 spike
208, 308 movement control device
209, 309 signal probe
210, 310 signal line
311 display device
312 signal evaluation unit
313 input interface
314 signal analyzing device
315 device signal generator
316 signal output
317 signal generation device
120, 220, 320 RF signal
404 mechanical probe support
405-408 arm
409-416 wireless probe

The invention claimed is:

1. A test device for a wireless communication device, the test device comprising:
 a device support that accommodates the wireless communication device,
 a movable position determination device comprising an image capturing device,
 a number of wireless probes for communicating with the wireless communication device,
 a mechanical probe support, wherein the wireless probes are mechanically coupled to the probe support and the probe support is mechanically coupled to the position determination device comprising the image capturing device, and wherein the position determination device comprising the image capturing device determines an absolute position of the wireless communication device on the device support or may determine a relative position of the wireless communication device on the device support at least with regard to one of the number of wireless probes; and
 a display device displaying position information regarding the absolute or relative position of the wireless communication device.

2. The test device according to claim 1, further comprising a housing, wherein the device support and the wireless probes and the mechanical probe support are positioned inside of the housing, and wherein the position determination device is movably mounted in the housing.

3. The test device according to claim 2, wherein the housing comprises an anechoic chamber.

4. The test device according to claim 2, wherein the position determination device is retractably mounted in the housing.

5. The test device according to claim 2, wherein the position determination device is mounted in the housing movable relatively to the device support.

6. The test device according to claim 2, wherein the mechanical probe support is movable relatively to the position determination device.

7. The test device according to claim 2, comprising an electromechanical or manual movement control device for the position determination device and/or the mechanical probe support.

8. The test device according to claim 1, wherein the position determination device comprises a visual position determination device and/or a distance measurement-based position determination device.

9. The test device according to claim 1, further comprising a display device coupled to the position determination device, wherein the display device receives position information for the wireless communication device from the position determination device and displays the position information.

10. The test device according to claim 1, wherein the position determination device determines the absolute position of the wireless communication device or determines the relative position of the wireless communication device at least with regard to one of the wireless probes.

11. The test device according to claim 1, wherein the wireless probes comprise an antenna with one or two polarizations and/or an over the air power sensor with one or two polarizations and/or power measurement diodes for one or two polarizations.

12. The test device according to claim 11, comprising a measurement control unit that is coupled to the wireless probes and evaluates signals received by the wireless probes and/or that is coupled to the wireless communication device and evaluates signals received by the wireless communication device.

13. The test device according to claim 1, wherein the wireless probes receive signals emitted by the wireless communication device.

14. The test device according to claim 1, wherein the wireless probes wirelessly transmit signals to the wireless communication device.

15. The test device according to claim 1, further comprising a signal evaluation unit with an input interface that is coupled to the wireless probes and with a signal analyzing device that is coupled to the input interface and analyzes signals received by the wireless probes.

16. The test device according to claim 1, further comprising a probe signal generator with a signal output that is coupled to the wireless probes and with a signal generation device that is coupled to the signal output and generates output signals that are transmitted to the wireless probes for emission by the wireless probes.

17. The test device according to claim 1, further comprising a device signal generator with a signal output that during a measurement is coupled to the wireless communication device and with a signal generation device that is coupled to the signal output and generates output signals that are transmitted to the wireless communication device for emission by the wireless communication device.

18. The test device according to claim 1, wherein the mechanical probe support comprises at least one circular arc shaped support that is coupled in the center of the arc with the position determination device and carries the wireless probes.

19. The test device according to claim 18, wherein the arc carries the wireless probes such that the directions of main sensitivity of the probes intersect at the center point of the arc.

20. The test device according to claim 18, wherein the mechanical probe support comprises two circular arc shaped supports that are each coupled in the center of the respective arc with the position determination device and that comprise a predetermined angle, especially a 90° angle, to each other.

21. A test method for a wireless communication device, the test method comprising:
- determining an absolute position of the wireless communication device on a device support or a relative position of the wireless communication device on the device support at least with regard to one of a number of wireless probes with a movable position determination device comprising an image capturing device, wherein a mechanical probe support is mechanically coupled to the position determination device, and wherein the number of wireless probes are mechanically coupled to the probe support and the probe support,
- displaying position information regarding the absolute position or the relative position of the wireless communication device on a display device,
- positioning the wireless probes for a measurement by moving the movable position determination device, and
- performing a device test using the wireless probes.

22. The test method according to claim 21, further comprising integrating the device support and the wireless probes and the mechanical probe support inside of a housing, especially an anechoic chamber, and movably mounting the position determination device in the housing.

23. The test method according to claim 22, wherein the position determination device is retractably mounted in the housing; and/or
- wherein the position determination device is mounted in the housing movable relatively to the device support; and/or
- wherein the mechanical probe support is movable relatively to the position determination device.

24. The test method according to claim 21, wherein the position determination device and/or the mechanical probe support are provided with an electromechanical or manual movement control device; and/or
- wherein the position determination device is provided as a visual position determination device and/or a distance measurement-based position determination device; and/or
- wherein the position determination device determines the absolute position of the wireless communication device or determines the relative position of the wireless communication device at least with regard to one of the wireless probes.

25. The test method according to claim 21, comprising receiving position information for the wireless communication device from the position determination device in a display device and displaying the position information.

26. The test method according to claim 21, wherein the wireless probes comprise an antenna with one or two polarizations and/or an over the air power sensor with one or two polarizations and/or power measurement diodes for one or two polarizations; and/or
- wherein the wireless probes receive signals emitted by the wireless communication device; and/or
- wherein the wireless probes wirelessly transmit signals to the wireless communication device.

27. The test method according to claim 21, comprising analyzing signals received by the wireless probes with a signal analyzing device; and/or
- comprising generating output signals and transmitting the generated output signals to the wireless probes for emission by the wireless probes; and/or
- comprising generating output signals and transmitting the generated output signals to the wireless communication device for emission by the wireless communication device; and/or
- comprising evaluating signals received by the wireless probes and/or signals received by the wireless communication device with a central measurement control unit.

28. The test method according to claim 21, comprising providing the mechanical probe support with at least one circular arc shaped support that carries the wireless probes, and coupling the at least one circular arc shaped support in the center of the arc with the position determination device.

29. The test method according to claim 28, comprising providing the wireless probes on the arc such that the directions of main sensitivity of the probes intersect at the center point of the arc; and/or
- comprising providing the mechanical probe support with two circular arc shaped supports that are each coupled in the center of the respective arc with the position determination device and that comprise a predetermined angle, especially a 90° angle, to each other.

* * * * *